US012650527B2

(12) United States Patent
Li et al.

(10) Patent No.: US 12,650,527 B2
(45) Date of Patent: Jun. 9, 2026

(54) PHOTON COUNTING DETECTORS AND MEDICAL IMAGING DEVICES

(71) Applicant: SHANGHAI UNITED IMAGING HEALTHCARE CO., LTD., Shanghai (CN)

(72) Inventors: Jingbo Li, Shanghai (CN); Zhen Nie, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 183 days.

(21) Appl. No.: 18/748,053

(22) Filed: Jun. 19, 2024

(65) Prior Publication Data

US 2024/0418876 A1      Dec. 19, 2024

(30) Foreign Application Priority Data

Jun. 19, 2023    (CN) ......................... 202321570130.X

(51) Int. Cl.
G01T 1/24           (2006.01)
(52) U.S. Cl.
CPC .............. G01T 1/241 (2013.01); G01T 1/242 (2013.01); G01T 1/247 (2013.01); G01T 1/249 (2013.01)

(58) Field of Classification Search
CPC ......... G01T 1/241; G01T 1/242; G01T 1/247; G01T 1/249
See application file for complete search history.

(56) References Cited

U.S. PATENT DOCUMENTS

| | | | |
|---|---|---|---|
| 8,080,803 B2 | 12/2011 | Freund et al. | |
| 2018/0329079 A1 | 11/2018 | Lu et al. | |
| 2019/0154852 A1* | 5/2019 | McCroskey | ........... A61B 6/585 |

FOREIGN PATENT DOCUMENTS

CN          114259245 A      4/2022

OTHER PUBLICATIONS

Martin J. Willemink et al., Photon-counting CT: Technical Principles and Clinical Prospects, Radiology, 2018, 20 pages.
Mats Danielsson et al., Photon-counting x-ray detectors for CT, Physics in Medicine & Biology, 2021, 36 pages.

* cited by examiner

*Primary Examiner* — Mark R Gaworecki
(74) *Attorney, Agent, or Firm* — METIS IP LLC

(57)          ABSTRACT
Embodiments of the present disclosure provides a photon counting detector. The photon counting detector may include a crystal including a crystal cathode, a support, a conductive layer electrically connected to the crystal cathode, and a compression structure that is connected to the support and presses one side of the conductive layer on at least a portion of a surface of the crystal cathode.

20 Claims, 9 Drawing Sheets

10

100

120

Third direction

First direction

Second direction

111

110

112

111-41       111-3 （111-31）    111-4       111-42

111-42   111-3 （111-31）   111-4     111-6    111-5

111-2

111-2

111-21

111-22

111-24

111-23

111-25

Third direction 111-44

111-4

111-3

PHOTON COUNTING DETECTORS AND MEDICAL IMAGING DEVICES

CROSS-REFERENCE TO RELATED APPLICATION

This application claims priority to Chinese application No. 202321570130.X filed on Jun. 19, 2023, the entire contents of which are incorporated herein by reference.

TECHNICAL FIELD

The present disclosure is related to a technical field of medical imaging devices, and in particular to a photon counting detector and a medical imaging device.

BACKGROUND

A photon counting detector (PCD) is used in a medical imaging device to effectively improve an imaging quality and a signal-to-noise ratio (SNR). Unlike a conventional energy-integrating detector (EID), which converts X-rays into visible light for detection, the photon counting detector uses a one-step conversion process that directly converts X-ray photons into an electrical current to generate a medical image. An energy spectrum computed tomography (CT) based on the photon counting detector is able to quantify an energy level of each photon to fully utilize energy information carried by X-rays. The photon counting detector is generally prepared based on crystals of semiconductor materials such as cadmium telluride (CdTe) or cadmium zinc telluride (CdZnTe). Photo-generated carriers are produced in the semiconductor material under radiation of X-rays. A crystal cathode of the photon counting detector needs to be connected to a high voltage negative electrode of a high voltage power supply device to apply a negative high voltage on the photon counting detector through the crystal cathode to enable a carrier collection in an anode pixel region. Currently, a connection structure between the photon counting detector and the high voltage power supply device may cause an adhesive residue on the crystal and is inconvenient to be processed.

Therefore, it is desirable to provide a photon counting detector and a medical imaging device to make integration and packaging of the crystal cathode and the high voltage power supply device simple, thereby avoiding a contamination of a surface of the crystal cathode with organic substances, and a damage to the surface of the crystal due to hard contact.

SUMMARY

One embodiment of the present disclosure provides a photon counting detector including: a crystal including a crystal cathode; a support; a conductive layer electrically connected to the crystal cathode; and a compression structure connected to the support. The compression structure may further press one side of the conductive layer to at least a portion of a surface of the crystal cathode.

In some embodiments, the conductive layer may be elastic.

In some embodiments, the conductive layer may include an elastic material, the elastic material being filled with conductive particles.

In some embodiments, the conductive layer may be configured a pressure-sensing structure.

In some embodiments, the conductive layer may include a first surface and a second surface spaced apart along a thickness direction of the conductive layer. The first surface may lead to a first electrical signal and the second surface may lead to a second electrical signal, so as to measure a resistance value between the first surface and the second surface. When the conductive layer is subjected to a pressure resulting in a change in thickness of the conductive layer, the resistance value between the first surface and the second surface may change accordingly.

In some embodiments, the conductive layer may include a plurality of pressure sensing positions. For each of the plurality of pressure sensing positions, each of a position of the first surface corresponding to the pressure sensing position and a position of the second surface corresponding to the pressure sensing position leads to a wire.

In some embodiments, the support may include a first support portion and a second support portion. The first support portion and the second support portion may be disposed on both sides of the crystal, respectively. One end of the compression structure may be connected to the first support portion, and the other end of the compression structure may be connected to the second support portion. Support heights of the first support portion and the second support portion may be variable.

In some embodiments, the compression structure may include an insulating layer. The insulating layer may cover an upper surface of the conductive layer. The compression structure may be connected to the support, and a lower surface of the conductive layer may be compressed over at least a portion of the surface of the crystal cathode.

In some embodiments, a hardness of the insulating layer may be greater than a hardness of the conductive layer.

In some embodiments, the conductive layer may include a conductive foam.

In some embodiments, the conductive layer may be electrically connected to a high voltage negative electrode.

In some embodiments, the photon counting detector may further include a conductive element connected between the conductive layer and the high voltage negative electrode.

In some embodiments, at least a portion of a surface of the compression structure and at least a portion of a surface of the conductive layer opposite to each other may be connected through an adhesive layer.

In some embodiments, one side of the compression structure close to the conductive layer may be provided with a positioning groove, and the conductive layer may be accommodated within the positioning groove.

In some embodiments, the compression structure may be detachably connected to the support.

In some embodiments, the photon counting detector may further include an anti-scattering grid. The anti-scattering grid may be detachably connected to the compression structure. The anti-scattering grid may be disposed on a side of the compression structure away from the conductive layer.

In some embodiments, the support may be provided with at least one positioning pin. The compression structure and the anti-scattering grid may be provided with positioning pin holes. The at least one positioning pin may be inserted in the positioning pin holes.

In some embodiments, the photon counting detector may include a crystal including a crystal cathode; a conductive layer electrically connected to the crystal cathode; and a compression structure that compresses one side of the conductive layer on at least a portion of a surface of the crystal cathode, so that the conductive layer is able to deform under a pressure of the compression structure and connect to the crystal cathode.

In some embodiments, the photon counting detector may include a support connected to the compression structure.

One of the embodiments of the present disclosure provides a medical imaging device including a photon counting detector and a high voltage power supply device. The photon counting detector may include: a crystal including a crystal cathode; a support; a conductive layer electrically connected to the crystal cathode; and a compression structure that is connected to the support and presses the other side of the conductive layer on at least a portion of a surface of the crystal cathode. The conductive layer of the photon counting detector may be electrically connected to a high voltage negative electrode of the high voltage power supply device.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein.

Figure 1:
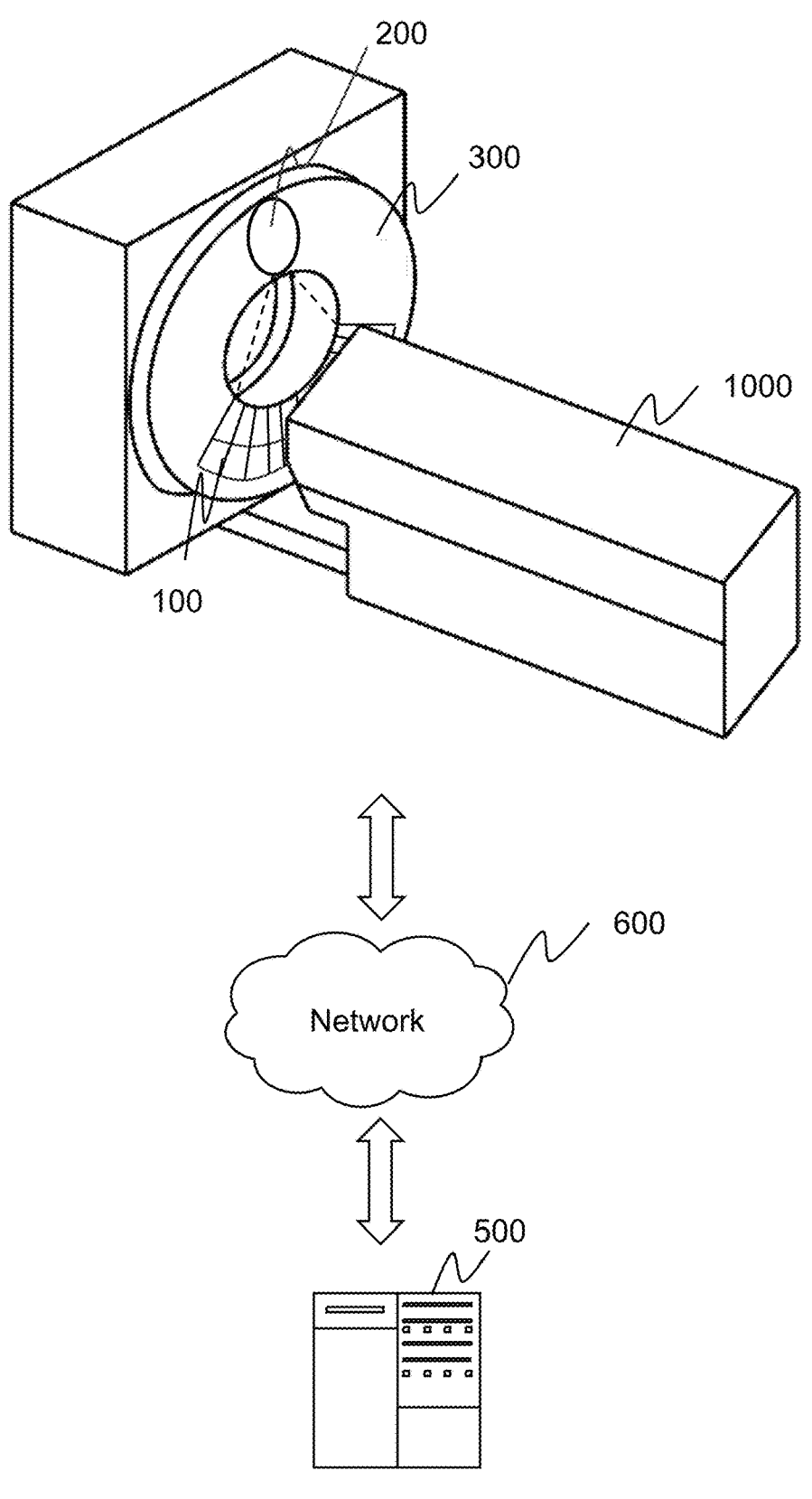
FIG. 1 is a schematic diagram illustrating an exemplary application scenario of a medical imaging device according to some embodiments of the present disclosure.

In the figures: 10, medical imaging device; 100, detector assembly; 110, photon counting detector; 111, sensor layer; 111-1, crystal; 111-11, crystal cathode; 111-12, crystal anode; 111-2, support; 111-21, first support portion; 111-22, second support portion; 111-23, base; 111-24, first adjusting portion; 111-25, second adjusting portion; 111-26, positioning pin; 111-3, conductive layer; 111-31, conductive foam;

111-32, first signal leading layer; 111-33, second signal leading layer; 111-4, compression structure; 111-41, through hole; 111-42, positioning pin hole; 111-43, insulating layer; 111-44, positioning groove; 111-5, high voltage negative electrode; 111-6, conductive element; 111-7, fixing screw; 111-8, anti-scattering grid; 111-9, insulating protective film; 111-91, double-sided adhesive; 111-92, conductive film; 112, readout electronics layer; 120, detector row; 200, emission assembly; 300, gantry; 400, scanning bed; 500, processing device; and 600, network.

DETAILED DESCRIPTION

In order to more clearly illustrate the technical solutions of the embodiments of the present disclosure, the following will briefly describe the accompanying drawings to be used in the description of the embodiments. Obviously, the accompanying drawings in the following description are only some examples or embodiments of the present disclosure, and it is possible for those skilled in the art to apply the present disclosure to other similar scenarios in accordance with these drawings without creative labor. The present disclosure may be applied to other similar scenarios based on these drawings without creative labor. Unless obviously obtained from the context or the context illustrates otherwise, the same numeral in the drawings refers to the same structure or operation.

It should be understood that the terms "mounted," "connected," "connected," "coupled," should be understood broadly. For example, they may be understood as a fixed connection, a removable connection, or an integrated connection; or, a mechanical connection, an electrical connection; a direct connection, or an indirect connection through an intermediate medium, or a connection within two elements. However, the words may be replaced by other expressions if other words accomplishes the same purpose.

As shown in the present disclosure and the claims, unless the context clearly suggests an exception, the words "a," "an," "one," and/or "the" do not refer specifically to the singular, but may also include the plural. Generally, the terms "including" and "comprising" suggest only the inclusion of clearly identified steps and elements. In general, the terms "including" and "comprising" only suggest the inclusion of explicitly identified steps and elements that do not constitute an exclusive list, and the method or apparatus may also include other steps or elements.

A photon counting detector adopts a one-step conversion process that directly converts X-ray photons into electrical currents to generate a medical image. The photon counting detector may be used in a medical imaging device to enable medical imaging. A crystal cathode of the photon counting detector needs to be connected to a high voltage negative electrode of a high voltage power supply device to apply a negative high voltage on the photon counting detector through the crystal cathode to enable a carrier collection in an anode pixel region. The connection of the crystal cathode to the high voltage negative electrode may include various manners.

Figure 8A:
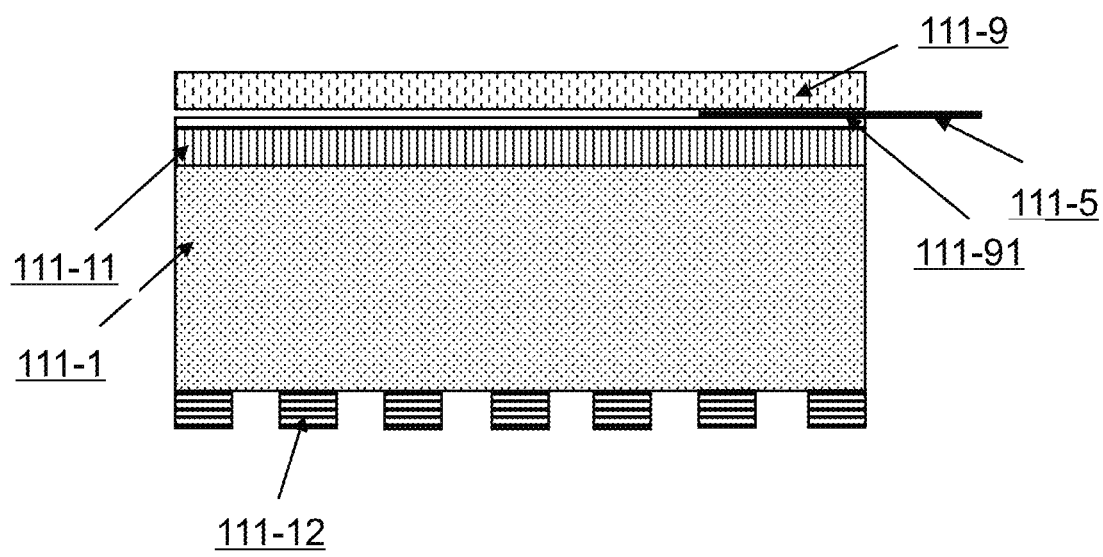
FIG. 8A is a schematic diagram illustrating an exemplary connection manner between a crystal cathode and a high voltage negative electrode according to some embodiments of the present disclosure.

As shown in FIG. 8A, a surface of a crystal cathode 111-11 may be connected to a high voltage negative electrode 111-5 (e.g., a conductive layer of a high voltage conductive strip) by a double-sided adhesive 111-91. Then, an insulating protective film 111-9 may cover the crystal cathode 111-11 and the high voltage negative electrode 111-5. This structure requires the double-sided adhesive 111-91 with a high bond strength to be adhered to the crystal cathode 111-11, which is not conducive to replacement of a crystal 111-1 of a photon counting detector 110, and is likely to result in the crystal cathode 111-11 having a surface with a residual adhesive.

Figure 8B:
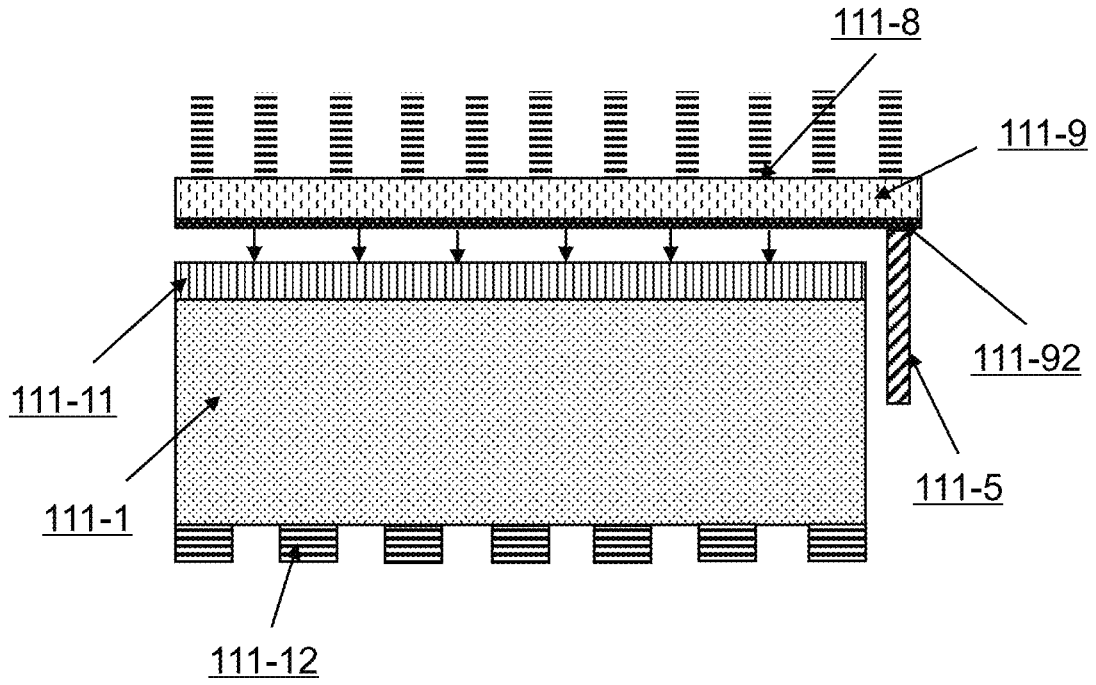
FIG. 8B is a schematic diagram illustrating an exemplary connection manner between a crystal cathode and a high voltage negative electrode according to some embodiments of the present disclosure.

As shown in FIG. 8B, by integrating the insulating protective film 111-9 and a conductive film 111-92 at a lower end of an anti-scattered grid (ASG) 111-8, the conductive film 111-92 may be in contact with the high voltage negative electrode 111-5 through convex contacts and may be fixed through screw holes (not shown in the figure) on the anti-scattered grid 111-8, thereby realizing an overall electrical connection between the conductive film 111-92 and the surface of the crystal cathode 111-11. This structure requires an integration of the insulating protective film 111-9 and the conductive film 111-92 on the anti-scattering grid 111-8, which is difficult to fabricate the anti-scattering grid 111-8 and is unable to be used for a crystal counting performance test when the anti-scattering grid 111-8 is absent.

Some embodiments of the present disclosure provide a photon counting detector and a medical imaging device including the photon counting detector. The photon counting detector provides a number of ways of connecting a crystal cathode to a high voltage negative electrode. The high voltage negative electrode may be connected to the crystal cathode through an elastic conductive layer, and then, by detachably connecting a compression structure to a support, the conductive layer and a surface of the crystal cathode may be in a stress contact, so as to realize a stable electrical connection between the high voltage negative electrode and the crystal cathode. A structure of the photon counting detector is designed to avoid a use of double-sided adhesive for binding, thereby avoiding a contamination of the crystal by organic substances. Moreover, as the conductive layer is elastic, a damage to the crystal by hard contact may be avoided. At the same time, as the compression structure is detachably connected to the support, a flexibility of the connection between the crystal cathode and the high voltage negative electrode may be improved.

The photon counting detector provided by the embodiments of the present disclosure is described in detail hereinafter in connection with FIG. 1-FIG. 6. It may be noted that the following embodiments are only for the purpose of explaining the present disclosure and do not constitute a limitation of the present disclosure.

FIG. 1 is a schematic diagram illustrating an exemplary application scenario of a medical imaging device according to some embodiments of the present disclosure, which is used to illustrate the application scenario of the medical imaging device including a photon counting detector. In some embodiments, a medical imaging device 10 may include a detector assembly 100, an emission assembly 200, and a high voltage power supply device (not shown in the figures). In some embodiments, the medical imaging device 10 may further include a gantry 300. In some embodiments, the medical imaging device 10 may also include a scanning bed 400. In some embodiments, the medical imaging device 10 may also include a processing device 500. In some embodiments, the medical imaging device 10 may also include a network 600. In some embodiments, the medical imaging device 10 may also include an electronics module, a cooling assembly, a storage device, and a user terminal (not shown in the figures).

The medical imaging device 10 may be configured to scan an object and/or generate data related to the object. In some embodiments, the medical imaging device 10 may be a medical imaging device. For example, the medical imaging device 10 may be a computed tomography (CT) device. Exemplarily, the medical imaging device 10 may be a photon counting energy spectrum CT device, a positron emission tomography-computed tomography (PET-CT) device, etc.

Figure 2:
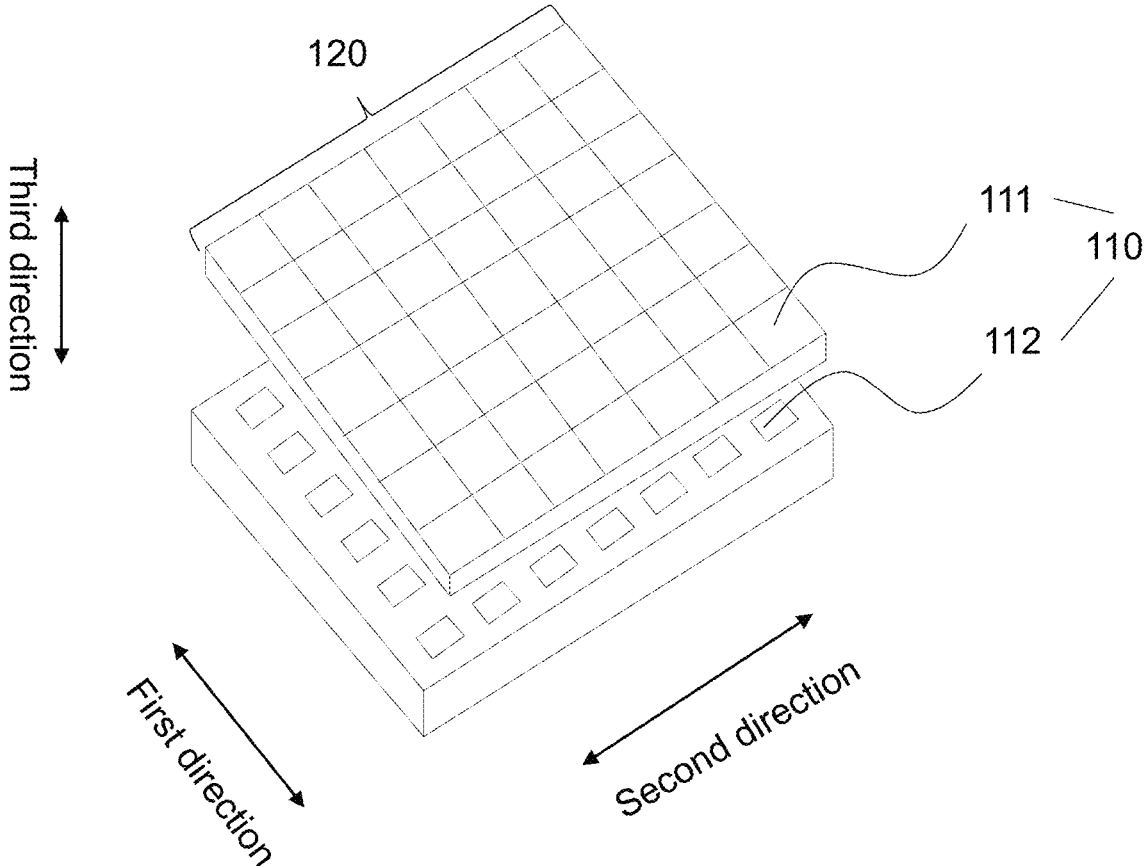
FIG. 2 is a schematic diagram illustrating an exemplary structure of a detector assembly according to some embodiments of the present disclosure.

The detector assembly 100 may detect radiation photons (e.g., X-ray photons, y-ray photons, etc.) of rays emitted from the emission assembly 200, and generate an electrical signal. In some embodiments, the detector assembly 100 may be a flat plate. In some embodiments, as shown in FIG. 1, the detector assembly 100 may be a curved plate. In some embodiments, the detector assembly 100 may include one or more photon counting detectors 110. For example, as shown in FIG. 2, the detector assembly 100 may include one or more detector rows 120 distributed along a first direction shown in FIG. 2. The detector row 120 may include a plurality of photon counting detectors 110 distributed along a second direction shown in FIG. 2. In some embodiments, the photon counting detector 110 may include a sensor layer 111 and a readout electronics layer 112. The sensor layer 111 may include a semiconductor crystal material, and the photon counting detector using the semiconductor crystal material may have a better performance (e.g., a higher radiation efficiency, a faster responsiveness, etc.). For more contents on the detector assembly 100, please refer to FIG. 2-FIG. 7 and their related descriptions.

The emission assembly 200 may be used to emit a ray beam. The ray beam may include an X-ray beam, a y-ray beam, etc. In some embodiments, the emission assembly 200 may include a ray emitter. The ray emitter may include a bulb tube. The ray beam emitted by the ray emitter may irradiate a detection region. In some embodiments, the object may be disposed in a detection region formed by the rays emitted by the emission assembly 200.

The emission assembly 200 and the detector assembly 100 may be used in conjunction to scan and image a portion of a person or an animal for diagnosis or treatment of a wide range of diseases.

Figure 3:
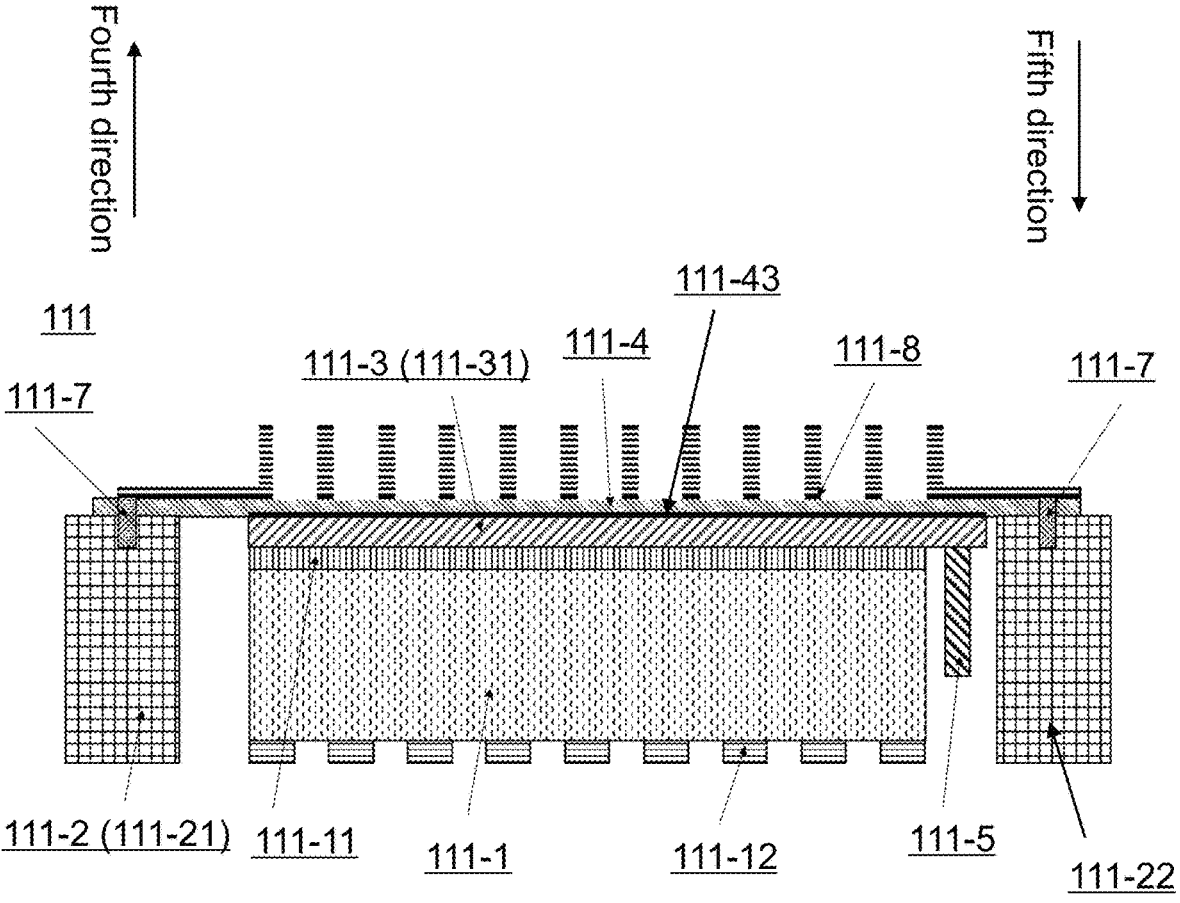
FIG. 3 is a schematic diagram illustrating an exemplary structure of a sensor layer according to some embodiments of the present disclosure.
Figure 5:
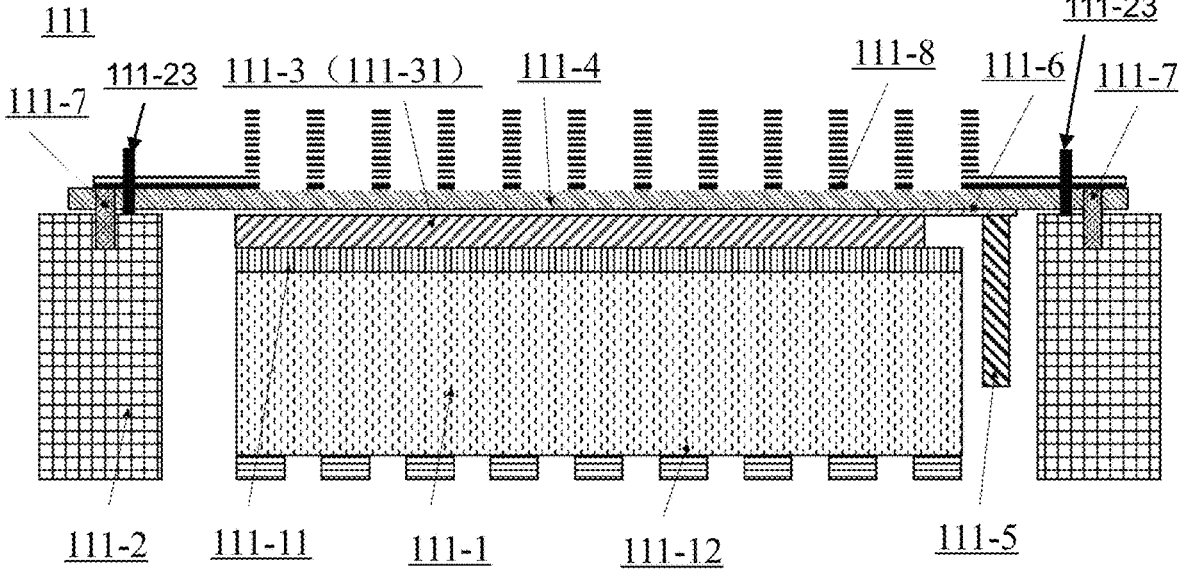
FIG. 5 is a schematic diagram illustrating an exemplary structure of a sensor layer according to some embodiments of the present disclosure.
Figure 6:
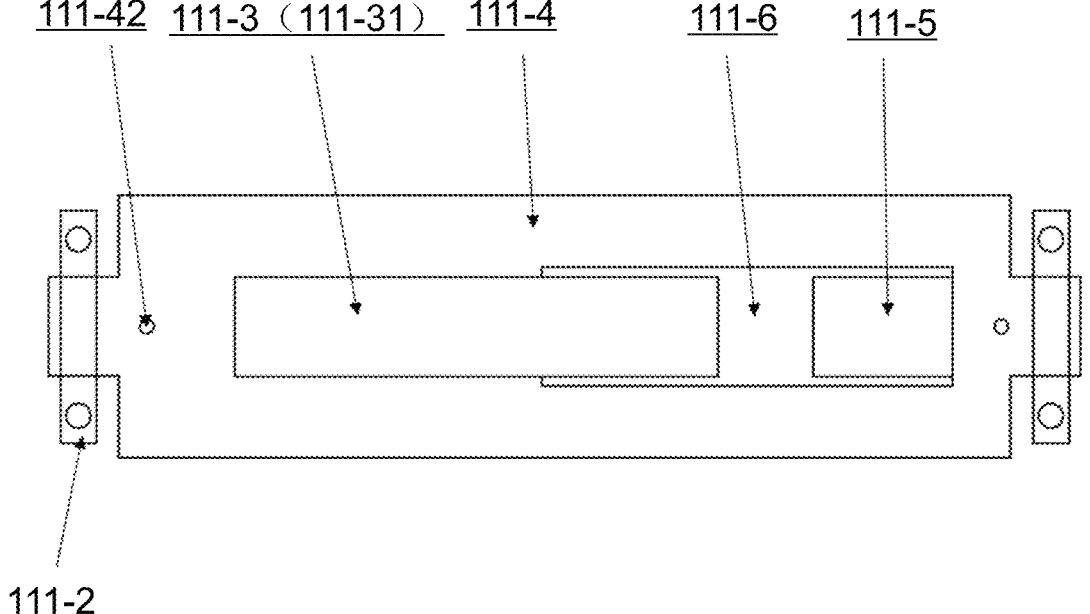
FIG. 6 is a schematic diagram illustrating a top view perspective of an exemplary sensor layer according to some embodiments of the present disclosure.

The high voltage power supply device may be a device that provides a negative high voltage to the photon counting detector 110. In some embodiments, the high voltage power supply device may include a high voltage negative electrode 111-5 (as shown in FIGS. 3, 5, and 6). In some embodiments, a conductive layer 111-3 of the photon counting detector 110 may be electrically connected to a high voltage negative electrode 111-5 of the high voltage power supply device to enable a photon counting detection. In some embodiments, the photon counting detector 110 may further include a conductive element 111-6, as shown in FIG. 5 and FIG. 6. The conductive element 111-6 may be connected between the conductive layer 111-3 and the high voltage negative electrode 111-5.

The gantry 300 may support one or more components of the medical imaging device 10. For example, one or more components of the medical imaging device 10 may include the detector assembly 100, the emission assembly 200, the electronics module, and the cooling assembly, etc. In some embodiments, the gantry 300 may include a main gantry, a gantry base, a front cover plate, and a back cover plate (not specifically shown in the figures). The front cover plate may be connected to the gantry base. The front cover plate may be perpendicular to the gantry base. The main gantry may be mounted to a side of the front cover plate. The main gantry may include one or more support frames to accommodate the detector assembly 100, the emission assembly 200, the electronics module, and/or the cooling assembly. The main gantry may include a circular opening within which the detection region may be formed to accommodate a scanning target (also referred to as an object). In some embodiments, the opening of the main gantry may be of other shapes, for example, the opening of the gantry may be oval.

In some embodiments, as shown in FIG. 1, the gantry 300 may include an annular structure. The detector assembly 100 and the emission assembly 200 may both be disposed on the annular structure, and the detector assembly 100 and the emission assembly 200 may be disposed at two ends of the annular structure in a diameter direction. The detection region may be disposed within the annular structure. The detection region may accommodate the object.

The scanning bed 400 may support the object and position the object in the detection region formed by the rays emitted from the emission assembly 200. In some embodiments, the scanning bed 400 may be positioned in the detection region formed by the rays emitted by the emission assembly 200, and the object may be placed on the scanning bed 400 for scanning. The scanning bed 400 may move under a control of the processing device 500 and reach the detection region.

The electronics module may collect and/or process the electrical signal generated by the detector assembly 100. The electronics module may include one or a combination of an amplifier (e.g., a charge sensitive amplifier), a comparator, a counter, a signal readout circuit, a parameter setting circuit, etc. The electronics module may convert an analog signal associated with an energy of the radiation rays received by the detector assembly 100 into a digital signal. The electronics module may compare a plurality of digital signals, analyze the plurality of digital signals, and determine a position of interaction and/or a time of interaction of the received radiation rays in the detector assembly 100. The electronics module may determine one or more coincidence events based on the plurality of digital signals. The electronics module may determine image data based on the coincidence events and an energy of the radiation rays determined to be the coincidence events.

The cooling assembly may generate, transfer, transmit, and conduct a cooling medium or circulate the cooling medium through the medical imaging device 10 to absorb heat generated by the medical imaging device 10 during an imaging process. In some embodiments, the cooling assembly may be fully integrated into and become a portion of the medical imaging device 10. The cooling assembly may allow the medical imaging device 10 to maintain a suitable and stable operation temperature (e.g., 25° C., 30° C., 35° C., etc.).

The processing device 500 may process data and/or information from the medical imaging device 10, a user terminal, and/or a storage device. For example, the processing device 500 may process the image data and reconstruct an image based on the image data. In some embodiments, the processing device 500 may be a single server or a server group. The server group may be centralized or distributed. In some embodiments, the processing device 500 may be local or remote. For example, the processing device 500 may read the information and/or data stored in the medical imaging device 10, the user terminal, and/or the storage device through the network 600. Furthermore, for example, the processing device 500 may be directly connected to the medical imaging device 10, the user terminal, and/or the storage device to read the stored information and/or data. In some embodiments, the processing device 500 may be implemented by a computing device. In some embodiments, the processing device 500, or a portion of the processing device 500, may be integrated into the medical imaging device 10.

The network 600 may connect one or more components of the medical imaging device 10 and/or connect the medical imaging device 10 to an external resource. In some embodiments, one or more components of the medical imaging device 10 (e.g., the detector assembly 100, the emission assembly 200, the processing device 500, the user terminal, the storage device, etc.) may communicate the information and/or data with one or more other portions of the medical imaging device 10 through the network 600. For example, the processing device 500 may obtain the image data from the medical imaging device 10 through the network 600. For another example, the processing device 500 may obtain a user instruction from the user terminal through the network 600.

The storage device may store the data/information obtained from various components of the medical imaging device 10. In some embodiments, the storage device may include any one or a combination of one or more of a mass memory, a removable memory, a volatile read-write memory, a read-only memory (ROM), etc. The mass memory may include a disk, an optical disk, a solid state drive, a removable storage, etc. In some embodiments, the storage device may store one or more programs and/or instructions to perform the exemplary methods described in the present disclosure.

In some embodiments, the storage device may be connected to the network 600 to enable communications with one or more components (e.g., the detector assembly 100, the emission assembly 200, the processing device 500, the user terminal, etc.) of the medical imaging device 10. One or more components of the medical imaging device 10 may read the data or instructions stored in the storage device over the network 600. In some embodiments, the storage device may be directly connected to or in communication with the one or more components (e.g., the detector assembly 100, the emission assembly 200, the processing device 500, the user terminal, etc.) of the medical imaging device 10. In some embodiments, the storage device may be a portion of the processing device 500.

The user terminal may include one or a combination of a mobile device 130-1, a tablet 130-2, a laptop 130-3, etc. In some embodiments, a user may also interact with one or more other components (e.g., the detector assembly 100, the emission assembly 200, the processing device 500, the storage device, etc.) of the medical imaging device 10 through the user terminal. In some embodiments, the user terminal may be a portion of the processing device 500.

FIG. 2 is a schematic diagram illustrating an exemplary structure of a detector assembly according to some embodiments of the present disclosure.

As shown in FIG. 2, the detector assembly 100 may include a plurality of detector rows 120 distributed along a first direction. For example, a count of the detector rows 120 may be 2, 16, 32, 64, etc. Each of the plurality of detector rows 120 may include a plurality of photon counting detectors 110 distributed along a second direction. For example, there may be 2, 16, 40, etc. photon counting detectors 110 included in each detector row 120. In some embodiments, the first direction may be an axial direction of the annular structure of the gantry 300 above, as shown in FIG. 1. The second direction may be perpendicular to the first direction. In some embodiments, the second direction may be a circumferential direction of the annular structure of the gantry 300. One photon counting detector 110 may correspond to one pixel of the detector assembly 100. With such arrangement, for the detector assembly 100, the photon counting detectors 110 may be arranged in an array to form a pixel array.

In some embodiments, as shown in FIG. 2, each of the plurality of photon counting detectors 110 may include the sensor layer 111 and the readout electronics layer 112. The sensor layer 111 may be used for detecting radiation photons to generate an electrical signal, and the readout electronics layer 112 may be used to process the electrical signal. The sensor layer 111 and the readout electronics layer 112 may be arranged in layers in a third direction. The third direction may be perpendicular to the first direction and the second direction. In some embodiments, the third direction may be a radial direction of the annular structure of the gantry 300. For any detector row 120, the sensor layers 111 in the plurality of photon counting detectors 110 may include the same material.

In some embodiments, the sensor layer 111 and the readout electronics layer 112 may be connected by soldering metal balls. In some embodiments, a structure of the sensor layer 111 may be as shown in FIG. 3. The sensor layer 111 may include a crystal 111-1, a support 111-2, a conductive layer 111-3, a compression structure 111-4, a fixing screw 111-7, and an anti-scattering grid 111-8. Incident rays (e.g., X-rays, γ-rays) may be absorbed by the crystal 111-1, and electron-hole pairs may be generated in the crystal 111-1 as a result of photoelectric interactions. As the crystal 111-1 is placed between a crystal cathode 111-11 and a crystal anode 111-12, the generated electrons may move along an applied electric field toward the crystal anode 111-12, while the generated holes may move in an opposite direction toward the crystal cathode 111-11. As a response, the crystal anode 111-12 may generate the electrical signal.

In some embodiments, the readout electronics layer 112 may include an amplifier, a threshold comparator, a counter, and a readout circuit, etc. After the photon counting detectors 110 are irradiated with photons, electrons and hole pairs may be generated inside the crystal 111-1. Negatively charged electrons and positively charged holes may move toward different electrodes to generate charges. Finally the charges may be collected and a resulting charge pulse may be programmed by a preamplifier as a voltage pulse. The signal output by the preamplifier may be amplified again by being converted to a Gaussian pulse through a Gaussian shaping amplifier. The electrical signal generated by the crystal anode 111-12 may be amplified by the amplifier (usually a charge sensitive amplifier) and sent to a threshold comparator. If the signal amplitude of the signal pulse output by the amplifier is greater than a given threshold, the counter may add one to the count of signal pulses. A count of electron-hole pairs may be proportional to the energy of the incident photons. Therefore, an amplitude of the signal pulse output by the amplifier may also be proportional to the energy of the incident photons. Therefore, a threshold level of the threshold comparator may be directly related to the energy of the incident photons. In some embodiments, through changing the threshold of the threshold comparator from small to great (or from great to small) to make a plurality of measurements, photon flow rates at different energy levels may be obtained. Then through a mathematical process, photon flow rates and energy spectra at different energies may be obtained. A count of signal pulses may be recorded by a counter, then a counting result may be transmitted to a readout circuit, and a final result may be displayed as an image.

In some embodiments, the crystal 111-1 of the sensor layer 111 may include a semiconductor crystal material, and a semiconductor crystal material may include at least one of a cadmium zinc telluride, a cadmium telluride, and a gallium arsenide.

In some embodiments, the sensor layer 111 of each photon counting detector 110 may include a high voltage negative electrode 111-5. When the ray emitter is a bulb tube, each photon counting detector 110 may need to be aligned with a focus of the tube, so there is a certain curvature on a surface of each photon counting detector 110. Therefore, the sensor layer 111 of each photon counting detector 110 may need to be provided with a high voltage negative electrode 111-5 to provide a negative high voltage to the crystal cathode 111-11, which ensures a more stable connection and a more convenient setup.

Figure 4:
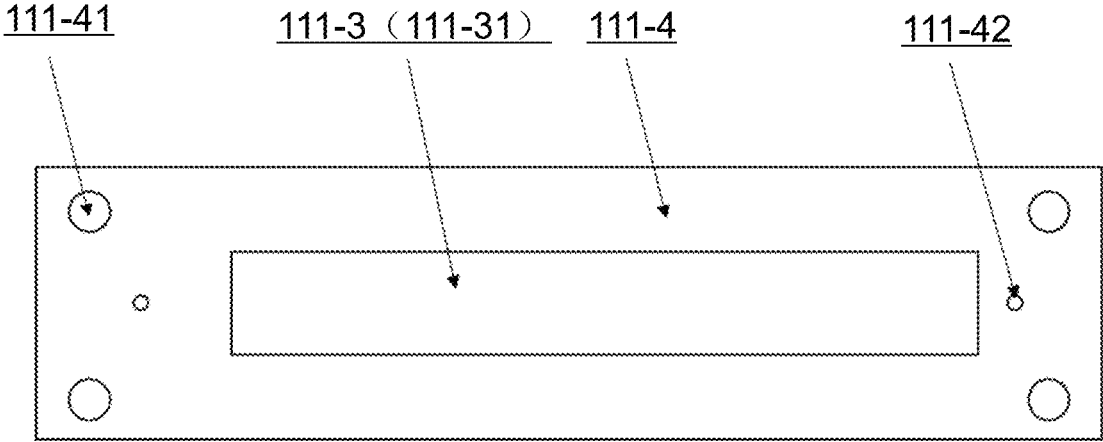
FIG. 4 is a schematic diagram illustrating a top view perspective of an exemplary sensor layer according to some embodiments of the present disclosure.

FIG. 3 is a schematic diagram illustrating an exemplary structure of a sensor layer according to some embodiments of the present disclosure. FIG. 4 is a schematic diagram illustrating a top view perspective of an exemplary sensor layer according to some embodiments of the present disclosure.

As shown in FIG. 3, the present disclosure provides the photon counting detector 110 including the sensor layer 111 and the readout electronics layer 112 (not shown in FIG. 3). The sensor layer 111 may include the crystal 111-1, the conductive layer 111-3, and the compression structure 111-4. The crystal 111-1 may include the crystal cathode 111-11 and the crystal anode 111-12. The compression structure 111-4 may compress one side of the conductive layer 111-3 on at least a portion of a surface of the crystal cathode 111-11, so that the conductive layer 111-3 is able to deform under a pressure of the compression structure 111-4 and stably connect to the crystal cathode 111-11. The conductive layer 111-3 and the high voltage negative electrode 111-5 may be electrically connected with each other through contact. A high voltage power supply device refers to a device that provides a negative high voltage to the photon counting detector 110, and the high voltage negative electrode 111-5 refers to an element of the high voltage power supply device. The negative high voltage of the high voltage power supply device may be connected to the crystal cathode 111-11 through the conductive layer 111-3.

In some embodiments, one side of the conductive layer 111-3 may cover at least a portion of a surface of the crystal cathode 111-11. The compression structure 111-4 may be pressed onto the other side of the conductive layer 111-3. As shown in FIG. 3, it may be understood that a lower surface of the conductive layer 111-3 may fit with at least a portion of the surface of the crystal cathode 111-11, and an upper surface of the conductive layer 111-3 may fit with a portion of the lower surface of the compression structure 111-4. In some embodiments, the lower surface of the conductive layer 111-3 may completely cover an upper surface of the crystal cathode 111-11 or may only cover a portion of the upper surface of the crystal cathode 111-11.

In some embodiments, the compression structure 111-4 may apply a certain pressure to the conductive layer 111-3. In some embodiments, the compression structure 111-4 may insulate the conductive layer 111-3 and the high voltage negative electrode 111-5 from external structures (e.g., an external housing of the photon counting detector 110, other photon counting detectors next to the photon counting detector 110, etc.). In some embodiments, the compression structure 111-4 may be made of a high dielectric constant material, for example, a printed circuit board (PCB), a polyimide, a rubber, etc.

In some embodiments, as shown in FIG. 3, the compression structure 111-4 may include an insulating layer 111-43 that covers an upper surface of the conductive layer 111-3. At this time, a material of the portion of the compression structure 111-4 other than the insulating layer 111-43 may be a high dielectric constant material or a non-high dielectric constant material. For more contents on the insulating layer 111-43, please refer to the below and the related descriptions.

In some embodiments, the sensor layer 111 may further include the support 111-2 configured to support the photon counting detector 110 and other structures. In some embodiments, a structure similar to the support 111-2 may be integrated below the compression structure 111-4. At this time, the sensor layer 111 may not include the support 111-2. The compression structure 111-4 may be connected to the support 111-2, and compress the conductive layer 111-3 on at least a portion of a surface of the crystal cathode 111-11. In this way, a reliability of the electrical connection between the conductive layer 111-3 and the crystal cathode 111-11 may be ensured, and a negative high voltage of the high voltage power supply device may be stably connected to the crystal cathode 111-11.

If the conductive layer 111-3 and the crystal cathode 111-11 are both rigid members, a hard contact may damage the crystal 111-1. In addition, if the conductive layer 111-3 and the crystal cathode 111-11 are both rigid members, to avoid the damage on the crystal 111-1, the compression structure may not apply a greater pressure on the conductive layer 111-3, which leads to an unexpected displacement of the conductive layer 111-3. In some embodiments, to solve this technical problem, the conductive layer 111-3 may be elastic, i.e., an conductive material with a certain deformability may be used, and thus the compression structure 111-4 may apply a certain pressure on the conductive layer 111-3, so that the conductive layer 111-3 is compressed to a certain extent and undergoes a certain deformation, which ensures an even contact between contact surfaces of the conductive layer 111-3 and the crystal cathode 111-11, and thus makes the electrical connection between the conductive layer 111-3 and the crystal cathode 111-11 reliable. At an end of the deformation, the conductive layer 111-3 may have a restoring force, which ensures that the contact between the conductive layer 111-3 and the crystal cathode 111-11 is tighter and more reliable. And, the elasticity of the conductive layer 111-3 may ensure that the crystal 111-1 is not damaged. In some embodiments, the conductive layer 111-3 may have an elasticity factor greater than 1 lbs/in. It may be understood that if the conductive layer 111-3 and the crystal cathode 111-11 are both rigid members, the hard contact may damage the crystal 111-1, so the conductive layer 111-3 may be elastic. However, an elastic conductive layer 111-3 may lead to an unstable contact between the conductive layer 111-3 and the crystal cathode 111-11. Therefore, the compression structure 111-4 may be disposed.

In some embodiments, the hardness of the conductive layer 111-3 may be correlated with the stability and service life, etc. of the electrical connection. In some embodiments, a contact pressure between the conductive layer 111-3 and the crystal cathode 111-11 may be related to a hardness of the conductive layer 111-3. An excessive hardness of the conductive layer 111-3 may result in a potentially unreliable electrical connection between the conductive layer 111-3 and the crystal cathode 111-11. Additionally, the hard contact may damage the crystal 111-1, which in turn affects a service life of the photon counting detector. In some embodiments, a Moh's hardness of the conductive layer 111-3 may be less than Shore A 50. In some embodiments, the Moh's hardness of the conductive layer 111-3 may be Shore A 45. In some embodiments, the Moh's hardness of the conductive layer 111-3 may be Shore A 40. In some embodiments, the Moh's hardness of the conductive layer 111-3 may be Shore A 30.

In some embodiments, the contact pressure between the conductive layer 111-3 and the crystal cathode 111-11 may be related to a thickness of the conductive layer 111-3. In some embodiments, the thickness of the conductive layer 111-3 may also affect an electrical conductivity of the conductive layer 111-3, as well as affect a scattering of photons. As the conductive layer 111-3 is in contact with the support 111-2 by the compression structure 111-4, and the conductive layer 111-3 has a certain deformation capability, when the thickness of the conductive layer 111-3 increases, an increase of the conductive layer 111-3 may increase a force on a cathode surface. In some embodiments, the thickness of the conductive layer 111-3 may be 0.1 mm to 2 mm, which reduces a photon ray scattering. In some embodiments, the thickness of the conductive layer 111-3 may be 0.5 mm to 1.9 mm. In some embodiments, the thickness of the conductive layer 111-3 may be 0.8 mm to 1.5 mm. In some embodiments, the thickness of the conductive layer 111-3 may be 0.9 mm to 1.4 mm. In some embodiments, the thickness of the conductive layer 111-3 may be 1.1 mm to 1.3 mm.

If the resistance of the conductive layer 111-3 is too large, the conductive performance of the conductive layer 111-3 may be affected. therefore, it is impossible for the conductive layer 111-3 to be electrically connected to the crystal cathode 111-11 and/or the high voltage negative electrode 111-5, respectively, and the crystal cathode 111-11 and the high-voltage negative electrode 111-5 may not form a stable electrical connection. In some embodiments, the resistance of conductive layer 111-3 may be less than 0.10/inch.

As the surface of the conductive layer 111-3 is in contact with a surface of the high voltage negative electrode 111-5, if a surface impedance of the conductive layer 111-3 is too great, an electrical signal of the high voltage negative electrode 111-5 may be reflected and interfered, thereby affecting a transmission quality of the electrical signal. In some embodiments, the surface resistance of conductive layer 111-3 may be less than 50 mΩ.

In some embodiments, as shown in FIG. 3 and FIG. 4, the conductive layer 111-3 may cover the crystal cathode 111-11 as well as the high voltage negative electrode 111-5 from a top-view perspective. The lower surface of the conductive layer 111-3 may be in contact with an upper end surface of the high voltage negative electrode 111-5 or in contact with contact points to realize the electrical connection. When the lower surface of the conductive layer 111-3 is in contact with the contact points of the upper end surface of the high voltage negative electrode 111-5, the contact points on the lower surface of the conductive layer 111-3 may correspond to the contact points of the upper end surface of the high voltage negative electrode 111-5. The lower surface of the conductive layer 111-3 may form a stable surface contact with the upper surface of the crystal cathode 111-11, thereby realizing the electrical connection.

In some embodiments, the conductive layer 111-3 may include an elastic material, and the elastic material may be filled with conductive particles. A type of the conductive particles and a proportion of the conductive particles may affect a resistivity (or conductivity) of the material. For example, the conductive layer 111-3 may be a conductive rubber. The conductive layer 111-3 may be formed by evenly distributing the conductive particles such as a silver-plated glass, a silver-plated aluminum, a silver, etc. uniformly distributed in a rubber to achieve a good electrical conductivity. Exemplarily, the conductive rubber may include a silicone rubber filled with nickel-plated graphite (CONSIL-NC), a silicone rubber extruded liner filled with silver (CONSIL-V), a silicone rubber filled with silver-plated aluminum (CONSIL-A), a silicone rubber filled with silver-plated nickel (CONSIL-N), a silicone rubber filled with silver-plated copper (CONSIL-C), a silicone rubber filled with graphite (SC-CONSIL), a silicone rubber filled with pure silver (CONSIL-R), a silicone rubber molded liner filled with silver (CONSIL-II), etc.

In some embodiments, the conductive layer 111-3 may be a conductive foam 111-31. The conductive foam 111-31 may be produced from a polymer composite material by foaming technology, and may have a high conductivity property and a certain deformation capability.

In some embodiments, the photon counting detector 110 may also include a pressure sensing assembly (not shown in the figures). The pressure sensing assembly refers to a device or apparatus that senses a pressure signal and converts the pressure signal into a usable output electrical signal in accordance with a certain rule. The pressure sensing assembly may include a pressure-sensitive element and a signal processing unit. According to different types of test pressures, the pressure sensing assembly may be categorized into a gauge pressure sensor, a differential pressure sensor, and an absolute pressure sensor. In some embodiments, the pressure sensing assembly may be a pressure-sensing structure formed by the conductive layer 111-3. In some embodiments, the pressure sensing assembly may be a pressure sensor between the compression structure 111-4 and the conductive layer 111-3, or between the conductive layer 111-3 and the crystal cathode 111-11.

As the compression structure 111-4 needs to provide a certain pressure to the conductive layer 111-3, there may be a certain contact pressure between the conductive layer 111-3 and the crystal cathode 111-11. During a process of pressing down the conductive layer 111-3 by the compression structure 111-4, the contact pressure at various positions on the conductive layer 111-3 may be uneven, which results in the contact pressure of a portion of a region between the conductive layer 111-3 and the crystal cathode 111-11 being too small or even no contact between the conductive layer 111-3 and the crystal 111-1. As a result, an encapsulation gap may be formed, which leads to an unexpected displacement of the conductive layer 111-3. Or, the contact pressure of a portion of the region between the conductive layer 111-3 and the crystal cathode 111-11 may be too high, which causes some damage to the crystal 111-1. Therefore, this contact pressure may be detected, and based on a detected value, the contact pressure may be adjusted. In some embodiments, to realize the detection of the contact pressure, the conductive layer 111-3 may form the pressure-sensing structure, i.e., the conductive layer 111-3 may realize the detection of the contact pressure by itself.

In some embodiments, the conductive layer 111-3 may include a first surface and a second surface spaced apart in a thickness direction of the conductive layer. The first surface may lead to a first electrical signal and the second surface may lead to a second electrical signal, so as to measure a resistance value between the first surface and the second surface. When the conductive layer 111-3 is subjected to a pressure, the conductive layer 111-3 may be compressed, and the thickness of the conductive layer 111-3 may change, which causes a resistance value between the first surface and the second surface to change accordingly (e.g., the resistance value may decrease).

The first surface leading to a first electrical signal, and the second surface leading to a second electrical signal refers to that the first surface leads to the first electrical signal at a pressure sensing position through a wire, and the second surface leads to the second electrical signal at the pressure sensing position through another wire. The wires may be wires having electrical conductivities. The wires may be formed by impregnating or coating a non-conductive material (e.g., a resin, a plastic, a silicone rubber, PVC, etc.) with a conductive material (e.g., a copper, an aluminum, etc.). The pressure sensing position refers to a position where the pressure is to be measured.

When the compression structure 111-4 provides a certain pressure to the conductive layer 111-3, the conductive layer 111-3 may be subjected to the pressure in the thickness direction of the conductive layer 111-3, the conductive layer 111-3 may be compressed, and the conductive particles at different heights may have more chance to be in mutual contact, thereby reducing the resistance. At different pressures, a compression rate may be different, and the resistance value may change greatly, i.e., the greater the pressure given to the conductive layer 111-3 by the compression structure 111-4, the more the conductive layer 111-3 is compressed, and smaller the resistance value. When the conductive layer 111-3 is compressed, the resistance value between the first surface and the second surface may change accordingly. Therefore, by leading to the first electrical signal through the first surface and leading to the second electrical signal through the second surface, the resistance value between the first surface and the second surface at the pressure sensing position may be measured, and thus the contact pressure between the conductive layer 111-3 and the crystal cathode 111-11 may be measured.

It may be understood that the thickness direction refers to a radial direction of the annular structure of the gantry 300. The first surface may be the upper surface of the conductive layer 111-3 and the second surface may be the lower surface of the conductive layer 111-3. Alternatively, the first surface may be the lower surface of the conductive layer 111-3, and the second surface may be the upper surface of the conductive layer 111-3.

In some embodiments, to determine the contact pressure at a plurality of points, the conductive layer 111-3 may include a plurality of pressure sensing positions, and for each of the pressure sensing positions, both of the first surface and the second surface corresponding to the pressure sensing position lead to wires. The plurality of pressure sensing positions may be a plurality of positions spaced apart on the conductive layer 111-3. For example, a count of the pressure sensing positions on the conductive layer 111-3 may be 2, 4, 7, 10, etc.

By setting the plurality of pressure sensing positions, the pressure sensing positions may be enabled to be distributed at different positions of the conductive layer 111-3 to determine the contact pressures at different positions on the conductive layer 111-3.

Figure 7:
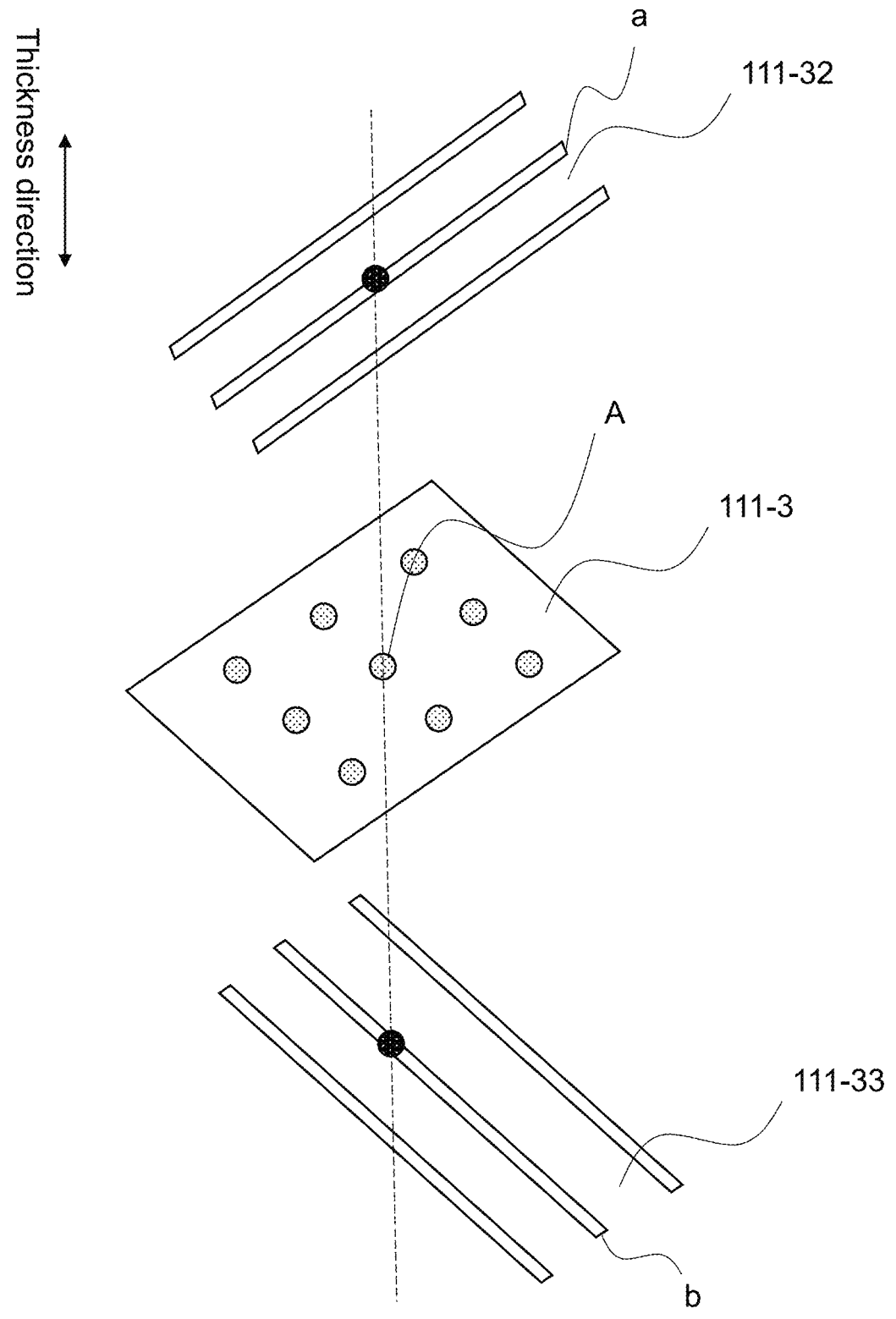
FIG. 7 is a schematic diagram illustrating an exemplary first signal leading layer and an exemplary second signal leading layer according to some embodiments of the present disclosure.

In some embodiments, the photon counting detector 110 may further include a first signal leading layer 111-32 and a second signal leading layer 111-33, as shown in FIG. 7. The first signal leading layer 111-32 may be in contact with the first surface (i.e., the upper surface of the conductive layer 111-3) to lead to the first electrical signal, and the second signal leading layer may be in contact with the second surface (i.e., the lower surface of the conductive layer 111-3) to lead to the second electrical signal. The first signal leading layer 111-32 may include a plurality of (e.g., 2, 4, 8, etc.) first wires spaced apart from each other, and the second signal leading layer 111-33 may include a plurality of (e.g., 2, 4, 8, etc.) second wires spaced apart from each other. The term of "spaced apart from each other" used herein refers to that there is a certain distance between two adjacent wires. At least two of the plurality of wires may be parallel to each other or not.

There may be a plurality of intersections between projections of the first wire and the second wire in the thickness direction of the conductive layer 111-3, and each of the intersections may serve as a pressure sensing position. For example, as shown in FIG. 7, a point A may be one of the intersections between the projections of a wire a in the first conductor and a wire b in the second wire in the thickness direction of the conductive layer 111-3, i.e., the point A may be a pressure sensing position.

By using the plurality of intersections between the projections of the first wire and the second wire in the thickness direction of the conductive layer 111-3 as the pressure sensing positions, and detecting the resistance value change at the pressure sensing positions between two surfaces spaced apart in the thickness direction of the conductive layer 111-3, an array pressure determination may be quickly and conveniently implemented.

In some embodiments, to enable the detection of the contact pressure, there may be a pressure sensor between the compression structure 111-4 and the conductive layer 111-3, or between the conductive layer 111-3 and the crystal cathode 111-11. According to a principle of transmissibility of force, both of a pressure value measured by the pressure sensor between the compression structure 111-4 and the conductive layer 111-3, and a pressure value measured by the pressure sensor between the conductive layer 111-3 and the crystal cathode 111-11 may reflect a value of the contact pressure between the conductive layer 111-3 and the crystal cathode 111-11.

The pressure sensor refers to a device or apparatus that senses a pressure signal and converts the pressure signal into a usable output electrical signal according to a certain rule. The pressure sensor may include a pressure-sensitive element and a signal processing unit. In some embodiments, the pressure sensor may include a gauge pressure sensor, a differential pressure sensor, and an absolute pressure sensor.

The pressure sensor may be designed to detect the contact pressure between the conductive layer 111-3 and the crystal cathode 111-11 to determine whether the contact pressure is even at each of the plurality of positions on the conductive layer 111-3 and whether some damage is caused to the crystal 111-1. Therefore, it is necessary to determine the contact pressure at the plurality of points. In some embodiments, there may be a plurality of pressure sensors for determining the contact pressures at the plurality of positions, and the pressure sensors may be spaced apart. For example, there may be 2, 4, 7, 10, etc. pressure sensors.

By providing the plurality of pressure sensors spaced apart, it is possible to enable the pressure sensors to cover different positions of the conductive layer 111-3 to determine the contact pressures at different positions on the conductive layer 111-3.

In some embodiments, as shown in FIG. 3, the support 111-2 may include a first support portion 111-21 and a second support portion 111-22. The first support portion 111-21 and the second support portion 111-22 may be respectively disposed on both sides of the crystal 111-1. One end of the compression structure 111-4 may be connected to the first support portion 111-21, and the other end of the compression structure 111-4 may be connected to the second support portion 111-22. To adjust the contact pressure, support heights of the first support portion 111-21 and the second support portion 111-22 may be changed. For example, during an installation of the sensor layer 111, when the contact pressure is detected by the pressure sensing assembly, and when the contact pressure on a left side is greater than the contact pressure on a right side and the contact pressure on the left side is less than a pressure threshold, an operator may increase the support height of the first support portion 111-21 on the left side (e.g., along the fourth direction in FIG. 3), or reduce the support height of the second support portion 111-22 (e.g., along the fifth direction in FIG. 3) without removing the installed assembly. The fourth direction may be a direction toward a center of a circle in the radial direction of the annular structure of the gantry 300. The fifth direction may be a direction pointing depart from the center of the circle in the radial direction of the annular structure of the gantry 300. For another example, during the installation of the sensor layer 111, when the contact pressure is detected by the pressure sensing assembly, and when the contact pressure on the left side and/or the contact pressure on the right side is greater than the pressure threshold, the processing device may increase the support height of the first support portion 111-21, and may increase the support height of the second support portion 111-22 higher. The pressure threshold may be set according to an encapsulation requirement. For example, the pressure threshold may be a value of pressure at which the crystal 111-1 damages.

In some embodiments, by adjusting a screw connecting the first support portion 111-21 and the compression structure 111-4, the height of the first support portion 111-21 may be adjusted; and by adjusting a screw connecting the second support component 111-22 and the compression structure 111-4, the height of the second support component 111-22 may be adjusted.

Figure 9:
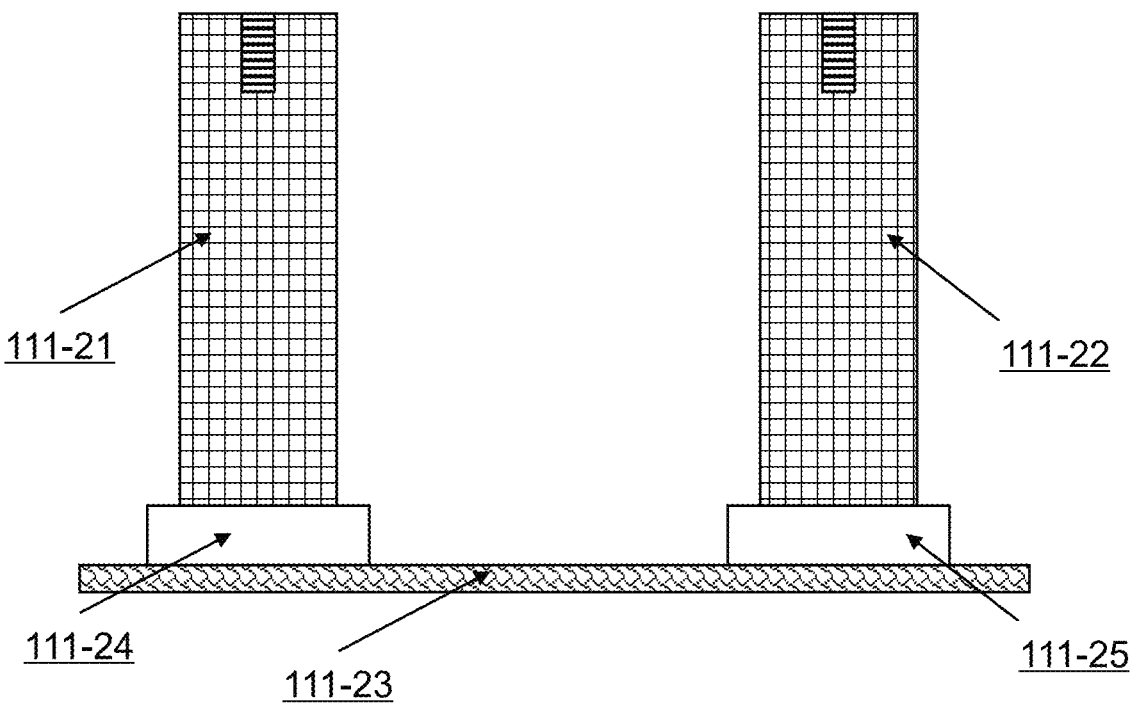
FIG. 9 is a schematic diagram illustrating an exemplary support according to some embodiments of the present disclosure.

In some embodiments, as shown in FIG. 9, the support 111-2 may also include a base 111-23, a first adjusting portion 111-24, and a second adjusting portion 111-25. The first support portion 111-21 may be disposed on one side of the base 111-23 through the first adjusting portion 111-24. By adjusting the first adjusting portion 111-24, a height of the first support portion 111-21 relative to the base 111-23 may be adjusted. The second support portion 111-22 may be disposed on the other side of the base 111-23 through the second adjusting portion 111-25. By adjusting the second adjusting portion 111-25, a height of the second support portion 111-22 relative to the base 111-23 may be adjusted. In some embodiments, the first adjusting portion 111-24 and the second adjusting portion 111-25 may include a gantry-pinion structure, a worm-gear structure, a threaded connection structure, etc. Through the first adjusting portion 111-24 and the second adjusting portion 111-25, the operator may manually adjust the heights of the first support portion 111-21 and the second support portion 111-22 relative to the base 111-23. In some embodiments, the first adjusting portion 111-24 and the second adjusting portion 111-25 may include a drive source such as a motor, a hydraulic cylinder, etc., thereby adjusting the heights of the first support portion 111-21 and the second support portion 111-22 relative to the base 111-23 through the drive source.

In some embodiments, the compression structure 111-4 may include an insulating layer 111-43. The insulating layer 111-43 may cover an upper surface of the conductive layer 111-3. The insulating layer 111-43 refers to a layer of material used to isolate the compression structure 111-4 from the conductive layer 111-3. The insulating layer 111-43 may isolate an electric charge in the conductive layer 111-3, prevent a current loss or an electrocution accident, so as to ensure a safe transmission of electric energy, and improve stability and reliability of a product. In some embodiments, the insulating layer 111-43 may include organic insulating materials (e.g., a polyethylene, a polyurethane, a polyester, etc.), inorganic insulating materials (e.g., a glass, a porcelain, a ceramics, etc.), and liquid insulating materials (e.g., transformer oils, silicone oils, fluoride fluids, etc.). Exemplarily, the insulating layer 111-43 may include a polytetrafluoroethylene, a plexiglass, a polyimide, a fiberglass plate, etc.

In some embodiments, the compression structure 111-4 may be connected to the support 111-2. The insulating layer 111-43 of the compression structure 111-4 may cover the upper surface of the conductive layer 111-3. The lower surface of the conductive layer 111-3 may be compressed on at least a portion of a surface of the crystal cathode 111-11 so that a stable electrical connection may be formed between the high voltage negative electrode 111-5 and the crystal cathode 111-11.

In some embodiments, a hardness of the compression structure 111-4 may be correlated with a durability and an ease of processing. A material with a high hardness may be susceptible to brittle fracture due to a strong intermolecular bonding and a small grain size. This phenomenon may not only affect the reliability and durability of the material, but also pose a harm to the safety of the material during use. And, the harder the material, the more difficult it is to process the material. In some embodiments, the compression structure 111-4 may also affect the stability of the structure. As the compression structure 111-4 is connected to the support 111-2 so that the stable electrical connection forms between the high voltage negative electrode 111-5 and the crystal cathode 111-11, when the compression structure 111-4 is too soft, a through hole 111-41 on the compression structure 111-4 may deform, causing the fixing screw 111-7 to pass through the through hole 111-41. As a result, the compression structure 111-4 may not be easily fixed on the support 111-2, and the contact pressure may be reduced, which causes the conductive layer 111-3 to be displaced, and causes the connection between the crystal cathode 111-11 and the high voltage negative electrode 111-5 to be unstable. For more contents on the connection between the through hole 111-41 and the support 111-2 please refer to the following relevant descriptions. In some embodiments, the Moh's hardness of the compression structure 111-4 may be 1.5 Mohs-6 Mohs. In some embodiments, the compression structure may be plexiglass, and the Moh's hardness of the compression structure 111-4 may be 2 Mohs-3 Mohs. In some embodiments, the compression structure may be a fiberglass plate, and the Moh's hardness of the compression structure 111-4 may be 4 Mohs-5 Mohs. In some embodiments, the compression structure may be polyimide, and the Moh's hardness of the compression structure 111-4 may be 3.5 Mohs. In some embodiments, the compression structure may be polytetrafluoroethylene, and the Moh's hardness of the compression structure 111-4 may be 2.2 Mohs.

In some embodiments, a hardness of the insulating layer 111-43 may be greater than a hardness of the conductive layer 111-3.

FIG. 5 is a schematic diagram illustrating an exemplary structure of a sensor layer according to some other embodiments of the present disclosure. FIG. 6 is a schematic diagram illustrating a top view perspective of an exemplary sensor layer according to some embodiments of the present disclosure.

In some embodiments, the photon counting detector 110 may also include a conductive element 111-6, as shown in FIG. 5 and FIG. 6. The conductive element 111-6 may be disposed between the conductive layer 111-3 and the high voltage negative electrode 111-5. An electrical connection between the conductive layer 111-3 and the high voltage negative electrode 111-5 may be implemented through the conductive element 111-6, and further, the electrical connection between the crystal cathode 111-11 and the high voltage negative electrode 111-5 may be implemented through the conductive element 111-6.

In some embodiments, the conductive element 111-6 may be a metal film with a high conductivity parameter. As shown in FIG. 5, a portion of the lower surface of the metal film may be connected to the conductive layer 111-3 and the high voltage negative electrode 111-5, respectively, so as to implement the electrical connection between the conductive layer 111-3 and the high voltage negative electrode 111-5. An upper surface of the metal film may be in contact with a lower surface of the compression structure 111-4. In some embodiments, an adhesive bonding (e.g., a double-sided adhesive bonding) may be adopted between the conductive element 111-6 and the compression structure 111-4. The metal film may have a relatively small thickness, which is disposed between the conductive layer 111-3 and the compression structure 111-4. As the conductive layer 111-3 is made of an elastic material, the metal film may not affect a contact pressure between the conductive layer 111-3 and the crystal cathode 111-11, that is to say, a stability of the electrical connection between the conductive layer 111-3 and the crystal cathode 111-11 may not be affected.

In some embodiments, the conductive element 111-6 may also be a metal wire. A size and a shape of the conductive element 111-6 may not be limited, as long as the stable electrical connection between the conductive layer 111-3 and the high voltage negative electrode 111-5 is implemented.

In some embodiments, as shown in FIG. 5, the size of the conductive layer 111-3 may cover only a portion of the upper surface of the crystal cathode 111-11. Compared to the above embodiments in which the conductive layer 111-3 completely covers the upper surface of the crystal cathode 111-11 and the high voltage negative electrode 111-5, the size of the conductive layer 111-3 may be reduced in this embodiment, thereby reducing a material cost of the conductive layer 111-3.

As deposited metal of a crystal cathode 111-11 is not divided according to pixels, the size of the conductive layer 111-3 do not need to be the exactly same as the size of the crystal cathode 111-11, but also to ensure the stability of a surface voltage of the crystal cathode 111-11. Accordingly, as shown in FIG. 5, in some embodiments, the size of the conductive layer 111-3 may be smaller than the size of the crystal cathode 111-11, which can reduce the material cost of the conductive layer 111-3 without affecting the stability of the electrical connection between the conductive layer 111-3 and the crystal cathode 111-11. For example, the size of the conductive layer 111-3 may be a half of the size of the crystal cathode 111-11. As another example, the size of the conductive layer 111-3 may be one-third of the size of the crystal cathode 111-11. As still another example, the size of the conductive layer 111-3 may be one-fourth of the size of the crystal cathode 111-11.

In some embodiments, there may be a plurality of conductive layers 111-3, and the plurality of conductive layers 111-3 may not be in contact with each other. For example, there may be two conductive layers 111-3 arranged on left and right sides of the crystal cathode 111-11.

In some embodiments, as the high voltage negative electrode 111-5 is not easy to be damaged because of contact, as shown in FIG. 5, the high voltage negative electrode 111-5 may also be electrically connected by integrating a conductive element 111-6, such as a metal block or a metal spring, on the compression structure 111-4.

In some embodiments, to ensure that the photon counting detector 110 is assembled quickly, at least a portion of a surface of the compression structure 111-4 and at least a portion of a surface of the conductive layer 111-3 opposite to each other may be bonded by an adhesive layer. A bonding position may be reserved on a lower surface of the compression structure 111-4 for fitting an upper surface of a conductive layer 111-3, and the upper surface of the conductive layer 111-3 may be bonded to the lower surface of the compression structure 111-4 by the adhesive layer. In this way, an accuracy of a mounting position of the conductive layer 111-3 may be ensured, and at the same time, a displacement of the conductive layer 111-3 during the use of the photon counting detector 110 due to an external force may be reduced.

Figure 10:
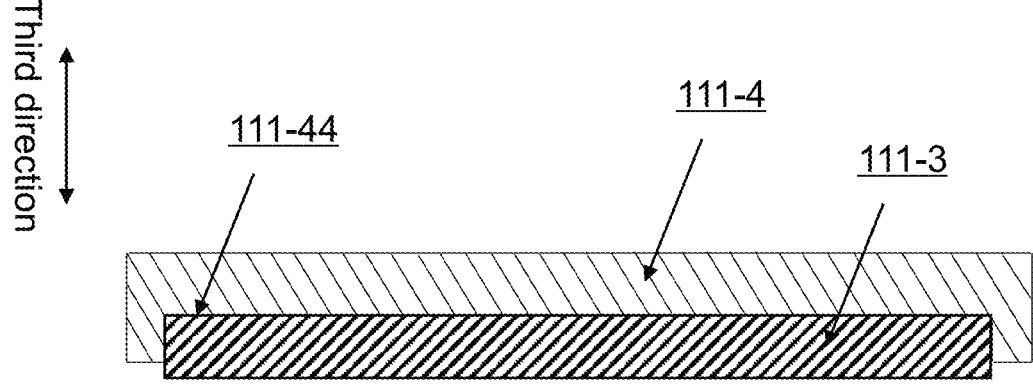
FIG. 10 is a schematic diagram illustrating an exemplary positioning groove according to some embodiments of the present disclosure.

In some embodiments, as shown in FIG. 10, one side (i.e., the lower surface) of the compression structure 111-4 close to the conductive layer 111-3 may be provided with a positioning groove 111-44. The conductive layer 111-3 may be accommodated within the positioning groove 111-44. In some embodiments, the conductive layer 111-3 may be made of a material with a certain deformation capability. A shape of the positioning groove 111-44 may correspond to a shape of the conductive layer 111-3, and a perimeter of the positioning groove 111-44 may be slightly smaller than a perimeter of the conductive layer 111-3. When the conductive layer 111-3 is accommodated in the positioning groove 111-44, an interference fit may be formed between the conductive layer 111-3 and the positioning groove 111-44. As a result, the conductive layer 111-3 and the positioning groove 111-44 may be in a tight coupling, and when assembled to the crystal and the support 111-2, it may not be easy for the conductive layer 111-3 to fall off from the positioning groove 111-44. A height of the positioning groove 111-44 in the third direction may be smaller than a height of the conductive layer 111-3 in the third direction, so as to avoid that when the conductive layer 111-3 contacts the crystal cathode 111-11, the conductive layer 111-3 may not be able to contact the compression structure 111-4, and thus may not be able to be subjected to the pressure from the compression structure 111-4. As a result, the compression structure 111-4 integrated with the conductive layer 111-3 may be assembled to the crystal and the support 111-2 more conveniently and accurately.

In some embodiments, the compression structure 111-4 may be detachably connected to the support 111-2.

In some embodiments, a screw connection may be utilized between the compression structure 111-4 and the support 111-2, as shown in FIG. 3 and FIG. 4. A plurality of fixing screw holes may be provided in the support 111-2. In some embodiments, four fixing screw holes may be provided symmetrically on four corners of the support 111-2, and the corresponding compression structure 111-4 may be provided with through holes 111-41 matching the positions of the four fixing screw holes. In some embodiments, when the support 111-2 is four columns spaced apart from each other, top ends of the four columns may be opened with four fixed screw holes, and corresponding compression structures 111-4 may be opened with through holes 111-41 matching the positions of the four fixed screw holes. The fixing screw 111-7 may be threaded through the through hole 111-41 from top to bottom in the fixing screw hole of the support 111-2 for quick assembly between the compression structure 111-4 and the support 111-2. The compression structure 111-4 may be connected to the support 111-2 by screw, which also facilitates the quick disassembly.

In some embodiments, in an assembly process of the compression structure 111-4 and the support 111-2, the processing device may measure a pressure between the compression structure 111-4 and the conductive layer 111-3 through a pressure sensing assembly, and then determine whether the compression structure 111-4 and the support 111-2 are assembled. The pressure sensing assembly may be a pressure sensing structure formed by the conductive layer 111-3, or a pressure sensor between the compression structure 111-4 and the conductive layer 111-3. For more contents about the pressure sensing assembly, please refer to the above and the related descriptions.

In some embodiments, during a process of screwing the fixing screw 111-7 into the fixing screw hole from top to bottom, when an average pressure between the compression structure 111-4 and the conductive layer 111-3 reaches a preset pressure threshold, and a difference between the pressures at four fixing screw holes is not greater than a difference threshold, the processing device may determine that the compression structure 111-4 and the support 111-2 are assembled.

The preset pressure threshold refers to the minimum pressure between the compression structure 111-4 and the conductive layer 111-3 when no displacement occurs between the conductive layer 111-3 and the crystal cathode 111-11. When the average pressure between the compression structure 111-4 and the conductive layer 111-3 is too small, the contact pressure between the conductive layer 111-3 and the crystal cathode 111-11 may be too small or the conductive layer 111-3 and the crystal 111-1 may even not be in contact with each other, which causes the conductive layer 111-3 to have an unexpected displacement.

The difference threshold refers to the maximum difference that is between the pressures at the four fixing screw holes and between the compression structure 111-4 and the conductive layer 111-3 while ensuring that the pressures at the four fixing screw holes are balanced. If the pressures applied on the compression structure 111-4 by the four fixing screws 111-7 are unbalanced, the contact pressure of a portion of the region between the conductive layer 111-3 and the crystal cathode 111-11 may be too small or the conductive layer 111-3 and the crystal 111-1 may even not be in contact with each other, which in turn causes a packaging gap, and an unexpected displacement of the conductive layer 111-3. Alternatively, if the contact pressure of a portion of the region between the conductive layer 111-3 and the crystal cathode 111-11 is too great, a certain damage may be caused to the crystal 111-1.

In some embodiments, the photon counting detector 110 may further include the anti-scattering grid 111-8. The anti-scattering grid 111-8 may be used to absorb scattered X-rays to prevent the scattered X-rays from interfering with a sensor of a detector. The anti-scattering grid 111-8 may be a thin plate-like structure, and a lower surface of the anti-scattering grid 111-8 may be in contact with an upper surface of the compression structure 111-4.

In some embodiments, to facilitate a subsequent crystal disassembly of the anti-scattering grids 111-8 for functional test verification, and to improve a flexibility of the integrated packaging manner of the photon counting detector 110, the anti-scattering grid 111-8 may be detachably connected to the compression structure 111-4. The anti-scattering grid 111-8 may be located on a side of the compression structure 111-4 away from the conductive layer 111-3.

In some embodiments, a plurality of through holes 111-41 may be reserved on the compression structure 111-4. A distance between two adjacent through holes 111-41 may be greater than a distance from a corresponding end of the anti-scattering grid 111-8 for subsequent installation of the anti-scattering grid 111-8 on the compression structure 111-4.

In some embodiments, as shown in FIG. 5, the support 111-2 may be provided with at least one positioning pin 111-26. The positioning pin 111-26 may be made of an insulating material and may be fixedly connected to the support. For example, the positioning pin 111-26 may be fixedly connected to the support through a fixed connection manner such as welding, riveting, or bonding. In some embodiments, the positioning pin 111-26 may also be detachably installed on the support. For example, a counterbore may be disposed on an upper surface of the support 111-2 as a mounting hole of the positioning pin 111-26, and the positioning pin 111-26 may be detachably mounted on the support 111-2. Positioning pin holes 111-42 may be disposed on the compression structure 111-4 and the anti-scattering grid 111-8. During the installation, by sleeving the positioning pin holes 111-42 on the positioning pins 111-26 of the support 111-2, the compression structure 111-4 and the anti-scattering grid 111-8 may be positioned with the support 111-2, which facilitates a high accuracy positioning installation.

In some embodiments, as shown in FIG. 6, the compression structure 111-4 may be provided with two positioning pin holes 111-42, then the corresponding support 111-2 may be provided with two positioning pins 111-26 to facilitate the quick and accurate positioning and assembly of the compression structure 111-4.

In some embodiments, magnetic positioning structures may be disposed on the support 111-2, the compression structure 111-4, and the anti-scattering grid 111-8, so as to implement positionings of the support 111-2, the compression structure 111-4, and the anti-scattering grid 111-8, and facilitate a high precision positioning installation. Each of the magnetic positioning structures may include a magnetic component and a metal component that is able to be attracted by the magnetic component. Merely as an example, upper and lower sides of the compression structure 111-4 may be respectively disposed with the magnetic component, and the lower surface of the anti-scattering grid 111-8 and the upper surface of the support 111-2 may each be disposed with the metal component.

In some embodiments, the compression structure 111-4 may also be fixed by modifying a size and a shape of an outer contour of the compression structure 111-4 and by using a metal sheet or a metal buckle. For example, as shown in FIG. 6, the corners of the compression structure 111-4 may be removed, and the metal sheet or the metal buckle may be installed on the corners of the support 111-2. The metal sheet or the metal buckle may be rotatably connected to the support 111-2 by pins. When the compression structure 111-4 is assembled on a top of the crystal 10, the metal sheet or the metal buckle may be toggled to realize a quick installation of the compression structure 111-4, and a certain pressure may be applied on the compression structure 111-4, so as to make a good contact between the lower surface of the conductive layer 111-3 under the compression structure 111-4 and the crystal cathode 111-11. In some embodiments, for the sake of simplicity of connecting the compression structure 111-4, the compression structure 111-4 may also be connected to the support 111-2 using a double-sided adhesive.

The photon counting detectors in some of the above embodiments may be assembled as follows.

First, the conductive layer 111-3 and/or the conductive element 111-6, may be integrated on the lower surface of the compression structure 111-4 according to a preset position. The preset position of the conductive layer 111-3 and/or the conductive element 111-6 may be a position that is in a positioning alignment with the relative position of the crystal cathode 111-11 and the high voltage negative electrode 111-5. The relative position of the crystal cathode 111-11 and the high voltage negative electrode 111-5 refers to physical positions of the crystal cathode 111-11 and the high voltage negative electrode 111-5 relative to the preset fixing screw holes in the support 111-2.

Second, the compression structure 111-4 integrating the conductive layer 111-3 may be placed above the crystal cathode 111-11, and the assembly position of the compression structure 111-4 may be quickly and accurately positioned through the positioning pin 111-26 on the support 111-2. By using the fixing screw reserved by the support 111-2 to perform a fixed pressing connection on the compression structure 111-4, a good contact between the lower surface of the conductive layer 111-3 and the crystal cathode 111-11 may be ensured.

Finally, the anti-scattering grid may be fixed above the compression structure 111-4 by means of the positioning pin 111-26, so as to complete an overall high-accuracy alignment installation of the anti-scattering grid, the compression structure 111-4, and the support 111-2.

The present disclosure also provides a medical imaging device including the photon counting detector 110 and the high voltage power supply device as shown in any of the above embodiments. The conductive layer 111-3 of the photon counting detector 110 may be electrically connected to a high voltage negative electrode of the high voltage power supply device.

Beneficial effects that may be brought about by the embodiments of the present disclosure may include, but not limited to, the followings. In the photon counting detector of the present disclosure, the crystal cathode and the high voltage negative electrode are integrated with a simple encapsulation process, and the conductive layer which deforms under force is used to be directly in contact with the crystal cathode to avoid contamination of organic substances on the surface of the crystal cathode, and a damage to the crystal surface caused by hard contact. At the same time, the compression structure may be detachably connected to the support, and the anti-scattering grid may be detachably connected to the compression structure, so as to improve a flexibility of an integrated package manner, and facilitate subsequent replacement and installation of the crystal, assembly and functional test and verification of the anti-scattering grid, and a flexible configuration of high voltage leads. In addition, the compression structure is fixed with fixing screw holes, and positioning pin holes with high accuracy are used for an overall positioning of the anti-scattering grids, the compression structure, and the support to prevent the compression structure from shifting and affecting the installation of neighboring photon counting detectors.

The basic concepts have been described above, and it is apparent to those skilled in the art that the foregoing detailed disclosure is intended as an example only and does not constitute a limitation of the present disclosure. While not expressly stated herein, those skilled in the art may make various modifications, improvements, and amendments to the present disclosure. Those types of modifications, improvements, and amendments are suggested in the present disclosure, so those types of modifications, improvements, and amendments remain within the spirit and scope of the exemplary embodiments of the present disclosure.

Also, the present disclosure uses specific words to describe embodiments of the present disclosure, such as "an embodiment," "one embodiment," and/or "some embodiments" means a feature, structure, or characteristic associated with at least one embodiment of the present disclosure. Accordingly, it may be emphasized and noted that the "one embodiment," "an embodiment," or "an alternative embodiment" referred to two or more times in different positions in the present disclosure or in different places in the present disclosure do not necessarily refer to the same embodiment. In addition, certain features, structures, or characteristics of one or more embodiments of the present disclosure may be suitably combined.

Similarly, it may be noted that to simplify the presentation of the present disclosure, and thereby aiding in the understanding of one or more embodiments of the present disclosure, the preceding description of embodiments of the present disclosure sometimes combines a variety of features into a single embodiment, accompanying drawings, or the description thereof. However, this method of disclosure does not imply that more features are required for the objects of the present disclosure than mentioned in the claims. Rather, the claimed subject matter may lie in less than all features of a single foregoing disclosed embodiment.

Some embodiments use numbers to describe the number of components and attributes, and it should be understood that such numbers used in the description of the embodiments are modified by the modifiers "about," "approximately," or "substantially." Unless otherwise noted, the terms "about," "approximately," or "substantially" indicates that a ±20% variation in the stated number is allowed. Correspondingly, in some embodiments, the numerical parameters used in the present disclosure and claims are approximations, which are subject to change based on the desired characteristics of individual embodiments. In some embodiments, the numerical parameters should take into account the specified number of valid digits and utilize a general digit retention method. While the numerical domains and parameters used to confirm the breadth of their ranges in some embodiments of the present disclosure are approximations, in specific embodiments such values are set to be as precise as possible within a feasible range.

Finally, it should be understood that the embodiments described in the present disclosure are only used to illustrate the principles of the embodiments of the present disclosure. Other deformations may also fall within the scope of the present disclosure. As such, alternative configurations of embodiments of the present disclosure may be considered to be consistent with the teachings of the present disclosure as an example, not as a limitation. Correspondingly, the embodiments of the present disclosure are not limited to the embodiments expressly presented and described herein.

What is claimed is:

1. A photon counting detector, comprising:
a crystal including a crystal cathode;
a support;
a conductive layer electrically connected to the crystal cathode; and a compression structure that is connected to the support and presses one side of the conductive layer on at least a portion of a surface of the crystal cathode.

2. The photon counting detector of claim 1, wherein the conductive layer is elastic.

3. The photon counting detector of claim 2, wherein the conductive layer includes an elastic material, the elastic material being filled with conductive particles.

4. The photon counting detector of claim 2, wherein the conductive layer includes a conductive foam.

5. The photon counting detector of claim 1, wherein the conductive layer is configured as a pressure-sensing structure.

6. The photon counting detector of claim 5, wherein
the conductive layer includes a first surface and a second surface spaced apart along a thickness direction of the conductive layer;
the first surface leads to a first electrical signal and the second surface leads to a second electrical signal, so as to measure a resistance value between the first surface and the second surface; and
when the conductive layer is subjected to a pressure resulting in a change in thickness of the conductive layer, the resistance value between the first surface and the second surface changes accordingly.

7. The photon counting detector of claim 6, wherein the conductive layer includes a plurality of pressure sensing positions, and for each of the plurality of pressure sensing positions, each of a position of the first surface corresponding to the pressure sensing position and a position of the second surface corresponding to the pressure sensing position leads to a wire.

8. The photon counting detector of claim 1, wherein
the support includes a first support portion and a second support portion, the first support portion and the second support portion being disposed on both sides of the crystal, respectively; and
one end of the compression structure is connected to the first support portion, the other end of the compression structure is connected to the second support portion, and support heights of the first support portion and the second support portion are variable.

9. The photon counting detector of claim 1, wherein the compression structure includes an insulating layer, the insulating layer covers an upper surface of the conductive layer, the compression structure is connected to the support, and a lower surface of the conductive layer is pressed on at least a portion of the surface of the crystal cathode.

10. The photon counting detector of claim 9, wherein a hardness of the insulating layer is greater than a hardness of the conductive layer.

11. The photon counting detector of claim 1, wherein the conductive layer is electrically connected to a high voltage negative electrode.

12. The photon counting detector of claim 11, further comprising a conductive element disposed between the conductive layer and the high voltage negative electrode.

13. The photon counting detector of claim 1, wherein at least a portion of a surface of the compression structure and at least a portion of a surface of the conductive layer opposite to each other are connected through an adhesive layer.

14. The photon counting detector of claim 1, wherein one side of the compression structure close to the conductive layer is provided with a positioning groove, and the conductive layer is accommodated within the positioning groove.

15. The photon counting detector of claim 1, wherein the compression structure is detachably connected to the support.

16. The photon counting detector of claim 15, further comprising an anti-scattering grid, the anti-scattering grid being detachably connected to the compression structure, the anti-scattering grid being disposed on a side of the compression structure away from the conductive layer.

17. The photon counting detector of claim 16, wherein the support is provided with at least one positioning pin, the compression structure and the anti-scattering grid are provided with positioning pin holes, and the at least one positioning pin is inserted in the positioning pin holes.

18. A photon counting detector, comprising:
a crystal including a crystal cathode;
a conductive layer electrically connected to the crystal cathode; and
a compression structure that compresses one side of the conductive layer on at least a portion of a surface of the crystal cathode, so that the conductive layer is able to deform under a pressure of the compression structure and connect to the crystal cathode.

19. The photon counting detector of claim 18, further comprising:
a support connected to the compression structure.

20. A medical imaging device, comprising a photon counting detector and a high voltage power supply device, the photon counting detector including:
a crystal including a crystal cathode;
a support;
a conductive layer electrically connected to the crystal cathode; and
a compression structure that is connected to the support and presses the other side of the conductive layer on at least a portion of a surface of the crystal cathode;
wherein the conductive layer of the photon counting detector is electrically connected to a high voltage negative electrode of the high voltage power supply device.

* * * * *